Nov. 3, 1925.
1,560,341
H. H. FLATH
AIRPLANE ADJUSTING DEVICE
Filed May 28, 1925
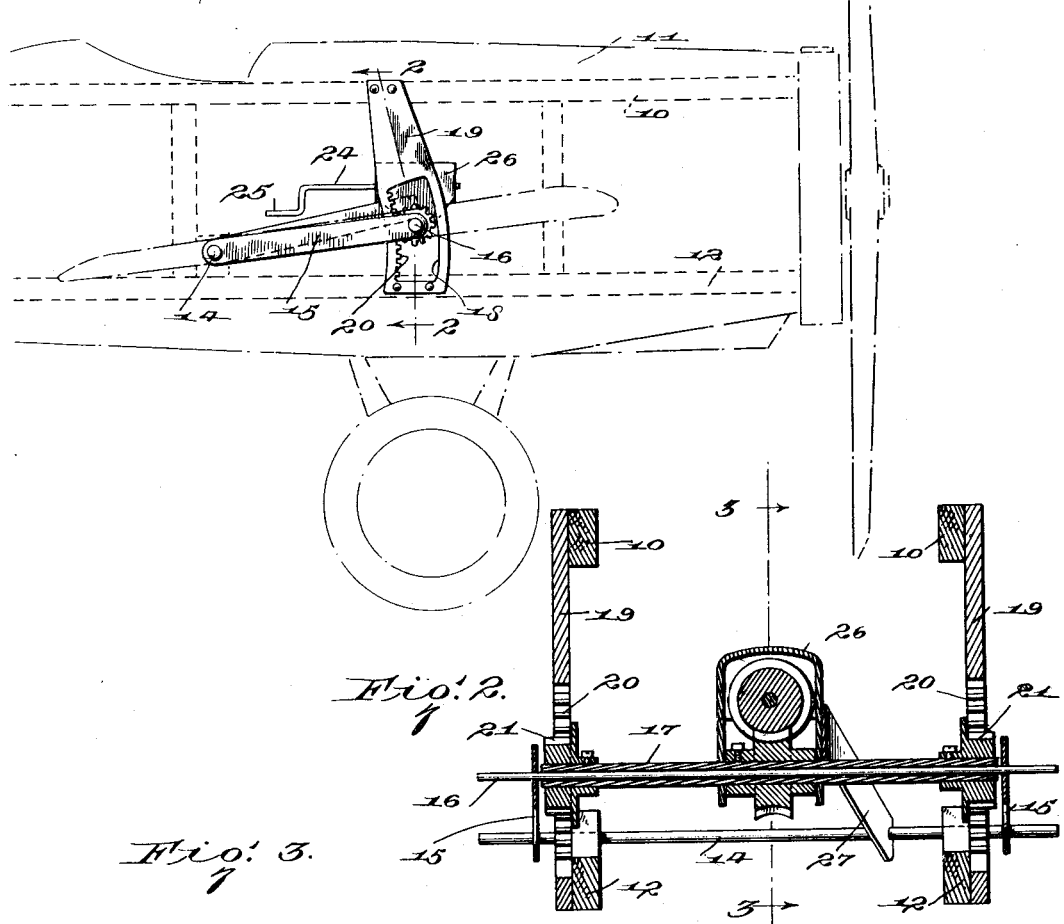
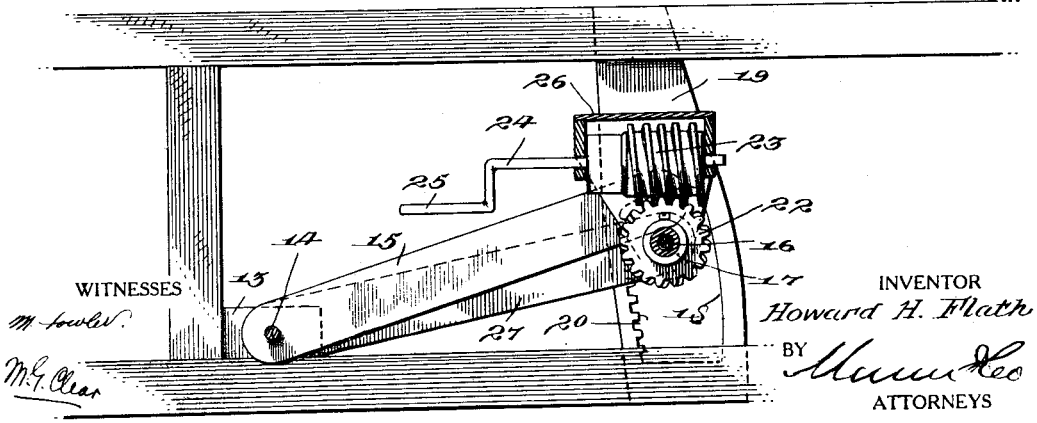
INVENTOR
Howard H. Flath
BY
ATTORNEYS
WITNESSES Patented Nov. 3, 1925.

1,560,341

UNITED STATES PATENT OFFICE.

HOWARD HERBERT FLATH, OF ERIE, PENNSYLVANIA.

AIRPLANE-ADJUSTING DEVICE.

Application filed May 28, 1925. Serial No. 33,530.

*To all whom it may concern:*

Be it known that I, HOWARD H. FLATH, a citizen of the United States, and a resident of Erie, in the county of Erie and State of Pennsylvania, have invented certain new and useful Improvements in Airplane-Adjusting Devices, of which the following is a specification.

My present invention relates generally to airplanes and more particularly to monoplanes, my object being the improvement of the actuating parts of that type of mechanism for changing the angle of incidence at will wherein means are employed within the fuselage and within easy reach of the operator whereby the wings may be simultaneously shifted by virtue of connections between such mechanism and the forward and rear beams of the wings.

Means have been before proposed for this general purpose but the complications of the mechanism within the fuselage for actuating the wing beam are sought to be eliminated by my present improvement with a consequent advantage in simplicity, economy and effectiveness.

Generally speaking my invention proposes an actuating mechanism including a pair of shafts, one of which is journalled for rotation at a fixed point and the other of which is swingable and connected to the first shaft for swinging movement in the arc thereof, together with means for rotating the second shaft and means to bring about its swinging movement by virtue of such rotation. The means employed for this purpose are such as to lock the swinging shaft at any adjusted point and prevent its adjusting movement except when induced by manual operation.

In the accompanying drawing which illustrates my present invention and forms a part of this specification, Figure 1 is a side view illustrating my invention.

Figure 2 is a vertical transverse section taken on line 2—2 of Figure 1, and

Figure 3 is a vertical longitudinal section taken on line 3—3 of Figure 2.

Referring now to these figures, I have shown at 10 the upper longerons of the fuselage 11 of an airplane the lower longerons being indicated at 12 and provided with bearings 13 for a cross shaft 14. To this cross shaft the rear beams of the airplane wings may be suitably attached or made integral, or the shaft may be hollow for the extension of the rear wing beams therethrough.

To the shaft 14 adjacent to opposite sides of the fuselage 11 are secured the rear ends of connecting arms 15 and the forward ends of these arms are secured to a cross beam 16 extending through a hollow forward cross shaft 17. The beam 16 may be either the forward wing beam of the airplane or may be utilized by connecting the wing beams to its ends.

The hollow forward cross shaft 17 swings upwardly and downwardly in the curved slots 18 of a pair of upright side brackets 19 secured to and between the upper and lower longerons 10 and 12. Along one side of the slots 18 thereof, the brackets 19 have racks 20 which are curved on the arc of circles having as their centers the rear cross shaft 14. Engaging the racks 20 are a pair of gears 21 fixed upon the forward hollow cross shaft 17 adjacent to its opposite ends.

Mounted and fixed centrally of the forward hollow cross shaft 17 is a worm wheel 22 and engaged with this worm wheel is a worm 23 secured on a shaft 24 having at its rear end a crank 25 by means of which shaft 24 may be readily rotated by hand. In the practical application of the invention it is contemplated that the parts will be so arranged and proportioned as to position the crank 25 within the cock pit of the fuselage and within easy reach of the operator.

The actuating worm 23 is disposed within a hood or shield 26 having bearings for the crank shaft 24 and this hood or shield also covers the worm wheel 22 and has side bearings at its lower portion through which the forward hollow shaft 17 extends. The hood or shield is furthemore braced and held by one or more brace arms 27 connected at one end thereto and connected at their opposite ends to the rear cross shaft 14.

It is obvious that upon rotation of the crank 25 the forward hollow cross shaft 17 will be correspondingly rotated through the crank shaft 24, worm 23 and worm wheel 22, and it is equally plain that by virtue of the rotation of this hollow shaft and the engagement of its end gears with the teeth of the racks, the forward hollow cross shaft will climb or descend the rack depending upon the direction of such rotation. In this way the forward wing beam carried by the forward transverse shaft will swing upwardly or downwardly as the case may be, with the rear wing beam turning as a fulcrum.

It is also obvious that the mechanism proposed by my invention for the above purpose will not only permit of the desired operation with little complication and effort, but will be effective for the intended purposes and will result in locking the wings at various angles by virtue of the fact that the worm wheel engages the worm at all times and cannot rotate except as it is rotated by the manual control through the worm.

I claim:

1. In an airplane wing controlling apparatus, forward and rear transverse shaft adapted to carry the wing beams of the plane, bearings in which one of said shafts is mounted, brackets having curved slots in which the other shaft is shiftable and having racks along one side of the slots, gears on said latter shaft engaging the racks, a worm wheel also on said latter shaft, a worm engaging the worm wheel, and a shaft on which said worm is secured, said last named shaft having a crank for manual rotation thereof.

2. In an airplane wing controlling apparatus, a pair of parallel spaced apart shafts adapted to carry the wing beams of the plane, one of said shafts being mounted to rotate at a fixed point, gears carried by the other of said shafts, curved racks engaged by said gears and stationarily mounted whereby to cause the gear carrying shaft to climb and descend the racks when said shaft is rotated, and manual means for rotating the said shaft.

3. In an airplane wing controlling apparatus, a pair of parallel spaced apart shafts adapted to carry the wing beams of the plane, one of said shafts being mounted to rotate at a fixed point, gears carried by the other of said shafts, curved racks engaged by said gears and stationarily mounted whereby to cause the gear carrying shaft to climb and descend the racks when said shaft is rotated, and a shaft having a manual crank and having a gear connection with said gear carrying shaft.

4. In an airplane wing controlling apparatus, a pair of parallel spaced apart shafts adapted to carry the wing beams of the plane, one of said shafts being mounted to rotate at a fixed point, gears carried by the other of said shafts, curved racks engaged by said gears and stationarily mounted whereby to cause the gear carrying shaft to climb and descend the racks when said shaft is rotated, and manual means for rotating the said shaft including a crank shaft and a worm and worm wheel, the worm wheel being carried by the gear carrying shaft and in constant engagement with the worm whereby to lock the said gear carrying shaft in various elevations against accidental displacement.

5. In an airplane wing controlling apparatus, a pair of parallel spaced apart shafts adapted to carry the wing beams of the plane, one of said shafts being mounted to rotate at a fixed point, gears carried by the other of said shafts, curved racks engaged by said gears and stationarily mounted whereby to cause the gear carrying shaft to climb and descend the racks when said shaft is rotated, and manual means for rotating the said shaft including manually actuated connections having means to secure the gear carrying shaft at various elevations against accidental displacement.

HOWARD HERBERT FLATH.